Sept. 22, 1942.  R. A. HINKLEY ET AL  2,296,347
GLASS WORKING APPARATUS
Filed Feb. 28, 1938  3 Sheets-Sheet 1
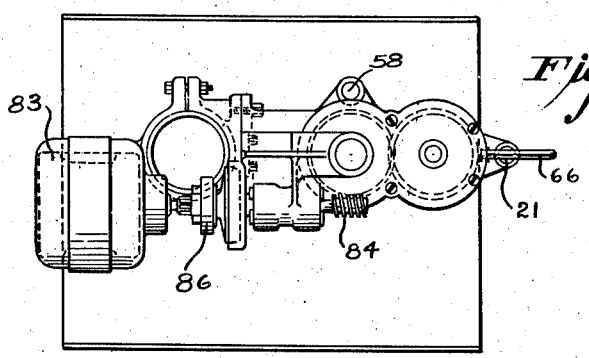
Fig.1
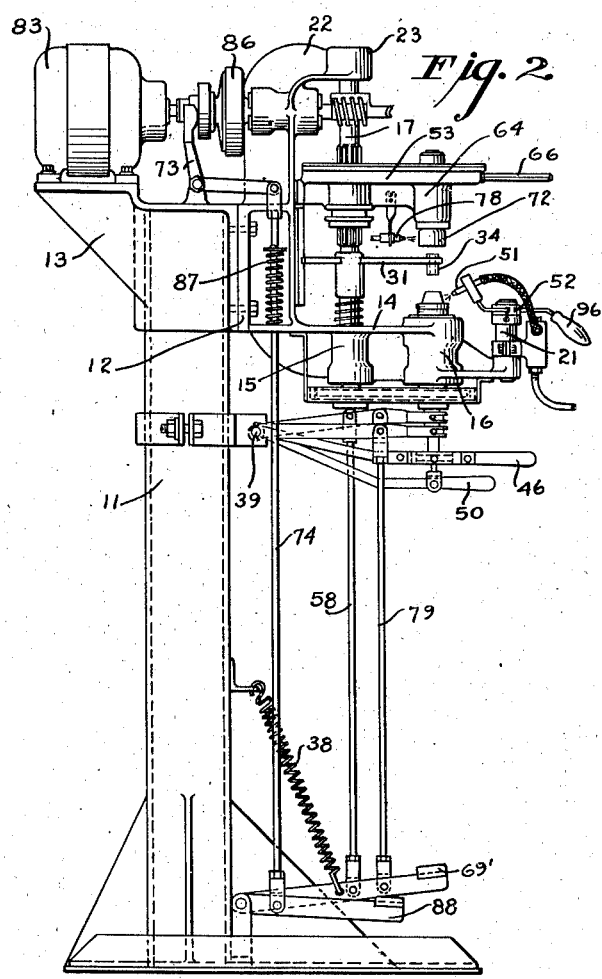
Fig.2
Fig.3
INVENTORS.
RAY A. HINKLEY
AND EDMUND H. WELLECH
BY Dorsey, Cole + Garner
ATTORNEYS.

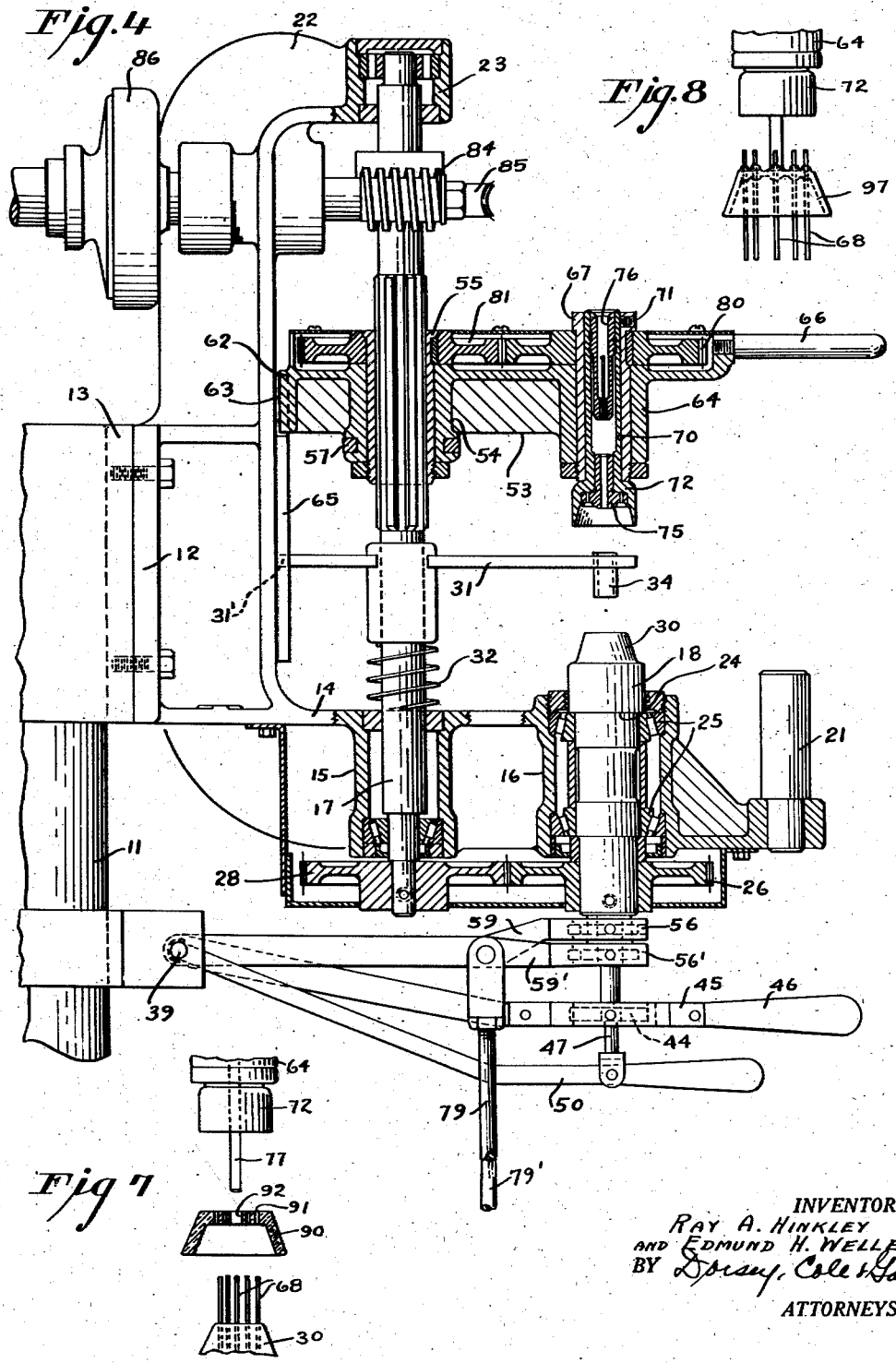

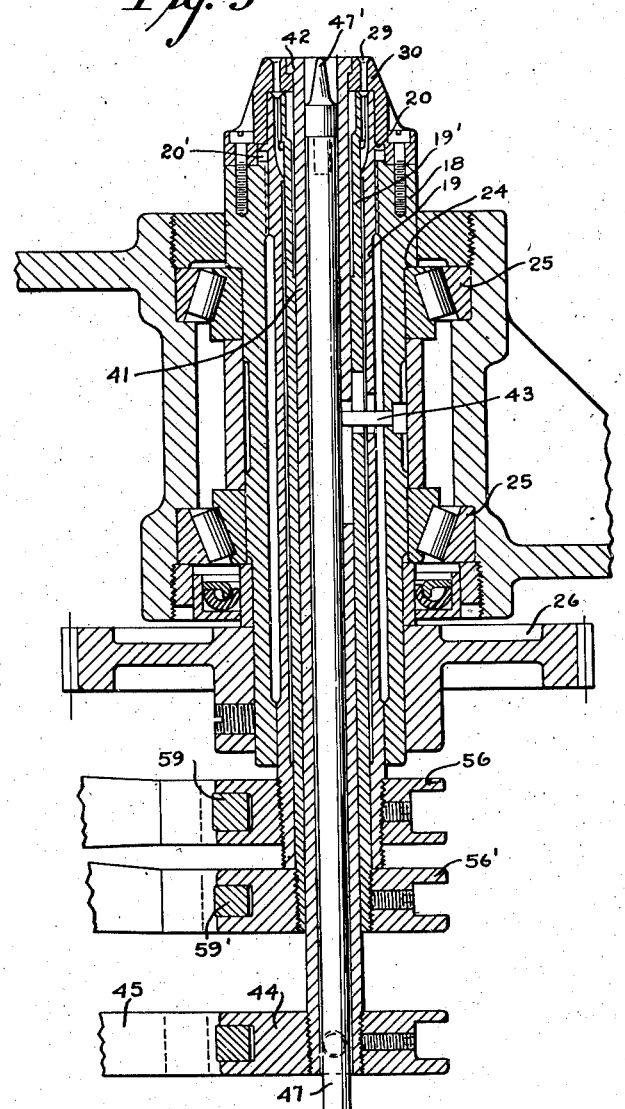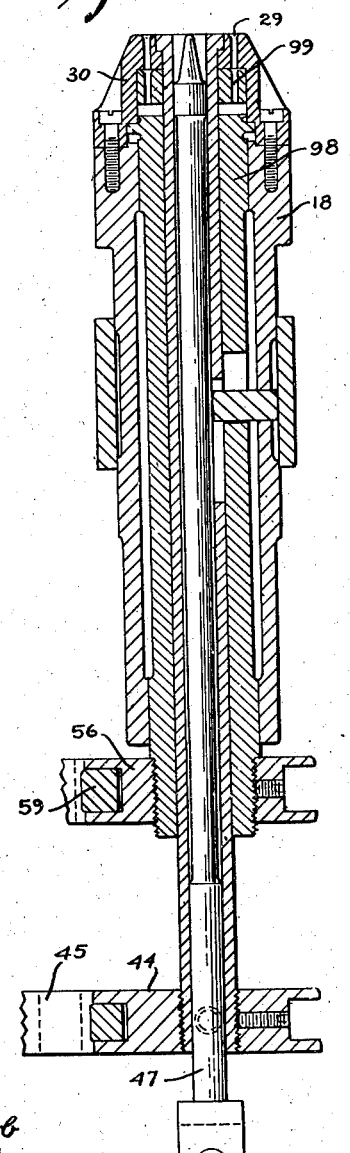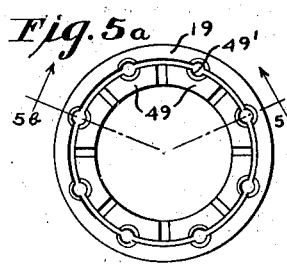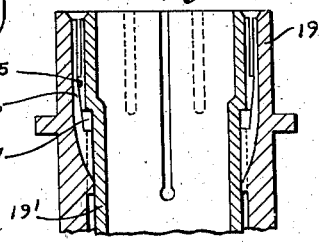

Patented Sept. 22, 1942

2,296,347

UNITED STATES PATENT OFFICE 2,296,347

GLASS WORKING APPARATUS

Ray A. Hinkley and Edmund H. Wellech, Corning, N. Y., assignors to Corning Glass Works, Corning, N. Y., a corporation of New York Application February 28, 1938, Serial No. 193,149

12 Claims. (Cl. 49—2)

The present invention relates to press or base assemblies for sealed containers such as electron discharge devices and to methods of and apparatus for fabricating improved forms of such articles.

A type of press or base assembly which has proven desirable for use in certain types of electron discharge tubes comprises a vitreous press provided with a central opening communicating with an exhaust tube perpendicular to and hermetically sealed to the press. Metallic elements serving as leading-in wires are embedded in the press around the exhaust tube and the edge of the press is hermetically sealed to the tube envelope, the electrode assembly being supported inside the envelope on the leading-in wires extending thru the press. Prior assemblies of this general form, with which applicants are familiar, comprise flat presses or bases and in order to keep the circular row of leading-in wires safely spaced from the peripheral edge portion, which must later be fused to the tube body, their diameter has to be made greater than desirable.

An object of the present invention is an improved form of article of the foregoing general character.

Another object is a new and novel method of fabricating tube base or press assemblies.

A still further object is a novel and simple form of apparatus by means of which applicants' novel method may be practiced commercially.

In accordance with the present invention the preformed press or base is made in the form of a shallow walled blank having an exhaust aperture thru the center of its base surrounded by apertures thru which the leading-in wires are passed, leaving the remotely disposed top of the wall for sealing to the tube proper which need be only of slightly greater diameter than the row of leading-in wires.

A simple form of production apparatus of the present invention embodies among its features a rotating support capable of holding a circular row of leading-in wires in predetermined relation with one another together with a preformed press thru apertures of which such leading-in wires are threaded; of suitable burners for heating the press and leading-in wires to render the press plastic; of a press center pin or exhaust tube centering element adapted to move axially thru the support to maintain an exhaust passage thru the press after it becomes plastic; of a rotating collet arranged above and concentric to the axis of the support for holding a piece of exhaust tubing and adapted for axial movement to bring the end of such tubing down over the centering element into fusing relation with the press; and of a pressing head carried with the tube collet and adapted to compress the plastic press to effectively seal the leading-in wires thereto.

The invention will be best understood by reference to the following description taken in connection with the accompanying drawings in which:

Fig. 1 is a plan view of one form of apparatus embodying the invention with certain parts omitted for the sake of clearness;

Fig. 2 is a side elevation of Fig. 1, but with certain parts omitted from Fig. 1 shown;

Fig. 3 is a front elevation of the upper half of the apparatus illustrated in Figs. 1 and 2:

Fig. 4 is an enlarged side elevation, partly in section, of the upper part of the assembly;

Fig. 5 is an enlarged sectional elevation of the rotating support and certain of the associated operating parts;

Fig. 5a is an enlarged plan view of the leading-in wire collet sleeves;

Fig. 5b is a sectional view taken on line 5b—5b of Fig. 5a;

Fig. 6 is a view similar to Fig. 5, but showing an alternative form of leading-in wire collet construction;

Fig. 7 is a side elevational view illustrating a fragment of tube base support 30 with a set of leading-in wires assembled therein, a preformed press in sectional elevation about to be threaded over such wires, and an evacuation tube suspended from a tube collet; and Fig. 8 is a view of a completed base or press assembly as it appears just before being withdrawn from the collet.

The apparatus herein illustrated comprises a footed column 11 supporting the various operating parts of the assembly which are, for the most part, carried by a head casting 12 bolted to a motor and head base 13 clamped to the column.

The casting 12 has a lower horizontal run 14 having housings 15 and 16 formed therein to accommodate suitable bearings for a vertical drive shaft 17 and for a quill shaft 18 which at its lower end carries a gear 26 in mesh with a driving gear 28 (Fig. 4) carried on the lower end of shaft 17. The run 14 is also pierced to accommodate a burner supporting post 21. The casting 12 also has an upper horizontal run 22 containing a housing 23 for a bearing in which the upper end of shaft 17 runs.

The quill shaft 18 has a shoulder 24 (Fig. 5) by which the shaft is supported on the inner race of the upper one of a pair of suitable bearings 25. A sleeve 19 passes thru the bore of shaft 18 and has its extreme upper inner end in the form of a cam surface 36 cooperative with a similar surface 35 on the outer surface of an inner sleeve 19'. The inner of these sleeves is slotted to form a circular row of flexible fingers or collet elements 49 having grooves 49' and adapted to receive and yieldingly hold leading-in wires 68 (Fig. 7) against the inner surface of sleeve 19. The cooperating cam surfaces 35 and 36 of sleeves 19' and 19 are such that downward movement of sleeve 19' with respect to 19 forces fingers 49 inward to free leading-in wires formerly seized between them and the sleeve 19. The distance of endwise movement of sleeve 19 with respect to sleeve 18 is limited by a flange 20 traveling in a space 20' provided between the top of sleeve 18 and a base or press support 30 fixed to the top of the sleeve 18. This support has apertures 29 therethru in register with the grooves 49' in the respective fingers 49 and in the inner surface of sleeve 19. The extent of axial movement of sleeve 19 with respect to 19' is limited by an operating space 37 between these sleeves, while a pin 43 passing thru sleeves 18 and thru slots and in the sidewalls of sleeves 19 and 19' prevents rotary movement of sleeves 19 and 19' with respect to support 30 which would interfere with the proper introduction of leading-in wires in the respective collet grooves. The lower ends of sleeves 19 and 19' are threaded into collars 56 and 56' carried by yoked levers 59 and 59' pivoted at 39 and to which are connected collet pull and collet release pedals 69 and 69' (Fig. 3) by suitable rods 79 and 79'.

The sleeves 19 and 19' and their associated operating pedals are normally held in their uppermost position by similarly arranged springs only the springs 38 associated with pedal 69 being visible.

A pin aligning arm 31 is carried by shaft 17 and held in suspended position by a spring 32. This arm can be rotated clockwise until its end 31' encounters guide bar 65 at which time its spacing element 34 is in coaxial relation with support 30. This arm is employed to press leading-in wires 68, arranged in support 30, to a common predetermined level as determined by the height of spacing element 34.

A knock out shaft 41 (Fig. 5) passes thru the bore in sleeve 19' and has a flanged upper end 42 which seats in an enlarged portion in the bore of support 30. The lower end of shaft 41 depends well below the lower end of sleeve 19' and in a similar fashion to sleeve 19' is carried in a collar 44 carried by a yoked knock out lever 46 (Fig. 4), having an operating handle 46 by means of which the knock out shaft can be raised to lift a fabricated press or base assembly 97 from support 30. Upward movement of shaft 41 is, however, limited by the pin 43 extending thru a slot in the wall of shaft 41.

A shaft 47, entering the bore of the knock out shaft 41, at its upper end carries a center pin 47' and at its lower end is connected to a hand operated lever 50 by means of which the center pin 47' can be readily raised following the proper heating of a vitreous press 90 to pierce and/or maintain an aperture 92 thru the center of the press open after the glass has become plastic in preparation for pressing of the glass about the leading-in wires 68 and for the fusion of an evacuating tube 77 to the press.

Any suitable form of heating apparatus may be employed. In the present disclosure (Fig. 2) a suitable form of burner 51 is mounted on a support 52 adapted to be mounted on and pivoted about post 21 by means of a handle 96 and being free for removal from the support to enable an attendant more freedom in directing the burner flames onto the work if found desirable.

The apparatus for handling an evacuating tube 77 to be sealed to the press and containing the pressing head is carried by a gear case 53 located intermediate the extensions 14 and 22 of head casting 12. This gear case has a housing 54 which contains a sleeve bearing 55 splined to shaft 17, enabling endwise movement of the gear case on such shaft and about which the gear case can also be rotated thru a horizontal arc in order to facilitate the various steps of the fabricating operations as will be more fully set forth hereinafter. The gear case 53 is normally held in its elevated position by a yoke 57 linked to a pedal shaft 58 connected with the pressing pedal 60 held in its upward position by one of the springs 38. The end of case 53 adjacent the vertical run of support 12 has a tooth 62 abutting against a long guide bar 63 which limits clockwise rotation of the case to a position in which a tube collet housing 64 therein is in coaxial relation with the press support 30. The gear case is equipped with a handle 66 by means of which the case may be swung counterclockwise when in its uppermost position. With the case in the position shown and the pedal 60 lowered as is essential in a pressing operation a second guide bar 65 becomes effective to definitely hold the case against rotary movement in a clockwise direction thereby insuring the retention of housing 64 in coaxial alignment with head 30.

Free to rotate in the housing 64 is a sleeve bearing 67 having a gear 80 fixed to its upper end. Projected upward into the bore of bearing 67 is a pressing unit holder 70 held fixed to the bearing by a set screw 71. Pressed upward into a bell 72 of holder 70 is a pressing unit insert 75. Threaded into the upper section of the inner wall of holder 70 is a tube collet 76. As will be evident a tube 77 to be fused to a press 90 may be introduced into the upper end of this collet and projected down thru the bore of the pressing unit 75. This operation can conveniently take place while the collet and pressing assembly is out of alignment with the tube base support 30 during which time heating of a press and an assembly of leading in wires is taking place. A burner 78 carried by case 53 is directed toward bell 72 in order to maintain it and the insert 75 at the best operating temperature.

Rotation of the tube collet and pressing head assembly is effected thru a drive gear 81 in mesh with gear 80 and carried on the upper end of sleeve 55. Power for driving shaft 17 and its sleeve 55 is supplied by a motor 83 coupled to a worm 84 in mesh with a suitable worm wheel 85 carried by shaft 17 thru a suitable clutch 86. This clutch is normally held disengaged by a spring 87 associated with an operating assembly including a bell crank 73, a pedal shaft 74 and a suitable pedal 88.

In one method of using the foregoing assembly leading in wires 68 are inserted in the apertures 29 of the base or press support 30, between the spring finger 49 and sleeve 19 being exactly aligned therebetween in grooves 49'. If there is any doubt as to the tops of the wires being even, arm 31 is rotated to bring element 34 over them and lowered to bring element 34 into engagement with the wires to even them up. A preformed press 90, preferably preheated, is then placed on the assembled leading-in wires which are quite readily threaded thru apertures 91 in the press. The clutch pedal 88 is now depressed to effect rotation of the press and pin assembly. With a press in place and rotating, heat is evenly applied over its entire surface until it becomes plastic after which pedal 69 is depressed causing sleeves 19 and 19' to be lowered in unison to draw the leading-in wires downwardly, thereby drawing plastic glass surrounding such wires down to the inner surface of the press. Continuing the application of heat, lever 50 is lifted thereby forcing the centering pin 47' up thru a center aperture 92 in the press. While holding lever 50 in its uppermost position the gear case handle 66 is seized and the gear case rotated clockwise until the tooth 62 thereon engages guide bar 63. The case is then lowered by depression of pedal 60 or handle 66 to bring the exhaust tube 77 down over center pin 47' into fusing relation to the surrounding plastic material. When it has been determined that proper fusion has occurred application of heat is discontinued by swinging the burner to one side and the pressing operation effected by further lowering the pressing head by means of pressing pedal 60. There is no appreciable pressure applied to the tube at this time, as the tube simply slides upward thru its collet 76.

The depth of the leading-in wire sockets in the pressing unit insert 75 and the extent of its downward movement are such, however, that the leading-in wires not only encounter the base of bell 72 but also force the collet sleeves 19 and 19' downward a slight distance against the tension of their springs 38 thereby positively insuring that the top ends of the leading in wires are perfectly even.

As soon as the pressing stroke is completed the pressing pedal is released allowing the pressing head to rise to its uppermost position, and of course if the sleeves 19 and 19' have been moved downward by the leading-in wires they are at once restored by their springs 38. The collet release pedal 69' is now depressed to lower sleeve 19' with respect to 19 thereby forcing fingers 49 inward to fully free the leading-in wires. The knock out lever is now momentarily actuated to raise the completed assembly 97 and the bottom ends of its leading-in wires 68 clear of base 30. This leaves the entire assembly suspended by the evacuating tube in collet 76 and by swinging the gear case to one side withdrawal of the completed assembly can be readily effected.

In Fig. 6 is shown an alternative form of leading-in wire collet which may be substituted for for the collet assembly comprising sleeves 19 and 19'. In the alternative structure a single sleeve 98 has holes 99 drilled in the top thereof which serve as the leading-in wire collets and has its lower end threaded into collar 56.

The associated pedal 69 in this form of construction merely serves as a convenient means of lowering the sleeve 98 to assist in passing the leading-in wires thru apertures 29 into holes 99.

The method followed when a one-piece sleeve is employed differs to the extent that during the heating of the press and the sealing of the evacuating tube thereto, the press is held off the support 30 by holding the knock out sleeve 41 slightly elevated. This permits the glass upon becoming plastic to sag about the leading-in wires so as to insure obtaining effective sealing thereof at the inner surface of the press without making it necessary to pull the wires downward to produce this result. The knock out shaft is released just as the insert 75 is brought in contact with the press. The subsequent operations are as already described.

While in the present disclosure the single unit as illustrated is equipped with pedals and hand levers for effecting various operations it should be understood that, where large production warrants it, applicant contemplates arranging a plurality of these units on a rotating turret in which case the various levers illustrated would be equipped with suitable rollers for actuation by a fixed cam track about which they would rotate. In such case suitable equipment would be also provided for automatically feeding leading-in wires successively to the respective units. With such an arrangement one or two operators can attend a plurality of units with great efficiency of labor.

What is claimed is:

1. An apparatus including a collet into which the respective leading-in wires of a tube press assembly may be arranged in predetermined relation and a preformed apertured press threaded over such wires, means for heating the press to plasticity, means for actuating the collet to seize and axially draw such wires and surrounding plastic glass of the press downward with respect to the major mass of the press and means for mechanically forcing the glass into intimate contact with such wires and to a final desired form.

2. In a combined glass to glass and glass to metal sealing apparatus, a press head, an assembly adapted to receive a plurality of metallic elements and a body of glass perforated to receive such elements, means for heating the body of glass and the metallic elements to the fusion temperature of the glass, said assembly including means for seizing the respective metallic elements and for drawing them and plastic glass surrounding and sticking to them downwardly for a limited distance, and means for lowering said head to press the glass to final form into intimate contact with such elements.

3. In a sealing apparatus, an assembly yieldably supporting an evacuating tube, a second assembly supporting a plurality of metallic elements and a glass press having an exhaust aperture and also apertures through which the elements pass, means for heating the press to plasticity, means for maintaining the exhaust aperture therein open after the glass has become plastic, and means for moving said first assembly to bring the evacuating tube into contact with the peripheral edge of the exhaust aperture at a pressure limited by the yieldability of said first assembly and to force glass of the press into sealing relation with the metallic elements.

4. In a sealing apparatus, means supporting an evacuating tube, a second means supporting a plurality of metallic elements and a glass press having a perforation, means for heating the press to plasticity, means for maintaining the perforation intact after the glass has become plastic, apparatus for operating said second means to seize the respective metallic elements and to draw them downwardly for a limited distance, and mechanism for moving said first means to bring the evacuating tube and press together to effect the fusion of the peripheral edge of the press to the tube and to press glass of the press into intimate contact with such elements.

5. In a sealing apparatus, a first glass pressing unit holding a plurality of metallic lamp elements and a glass body in predetermined relation, a second glass pressing unit, arranged coaxial with said first unit holding a second glass body, means for heating the glass body held by said first unit to a plastic condition, and means for moving said second unit relative to said first unit to effect fusion together of the glass bodies and to press glass of one of said bodies between said units into intimate contact with the metallic elements.

6. Apparatus which includes a collet holding a glass press with lead-in wires threaded through certain apertures of the press, means for heating the press to plasticity, a pin to maintain one aperture of the press open after the press becomes plastic, a second collet holding an evacuating tube and having a pressing head associated therewith, and means to move one of said collets relative to the other to bring the wall of the tube into sealing relation with the glass of the press surrounding the aperture maintained open by said pin and for bringing said pressing head into engagement with the press to force plastic glass thereof into intimate contact with the lead-in wires.

7. In a sealing apparatus, a holder resiliently supporting a glass tube, a support holding a plurality of metallic elements each surrounded by glass of an associated press having an exhaust aperture, means for heating the press to plasticity, means for maintaining the exhaust aperture of the press after the press has become plastic, means for moving said holder to bring an end of the tube into position for fusion to glass surrounding the exhaust aperture and for thereafter moving said holder relative to the tube to force glass of the press into intimate contact with the respective metallic elements.

8. In an assembly for sealing together lamp parts, a support for the receipt of lead-in wires and a glass press, a press head aligned over said support including a chuck for the receipt of an evacuating tube, means for heating a press to plasticity, and means for lowering said press head to bring an evacuating tube in sealing relation with a press and to effect sealing of the press about lead-in wires associated therewith.

9. In an assembly for sealing together lamp parts, a support for the receipt of lead-in wires and a glass press, a press head aligned over said support including a chuck for the receipt of an evacuating tube, means for rotating said support and press head in unison, means for heating a press to plasticity as it is rotated, and means for lowering said press head to bring an evacuating tube into sealing relation with a press and to effect sealing of the press about lead-in wires associated therewith.

10. In an assembly for sealing together lamp parts, a support for a glass press and for lead-in wires to be sealed into a press, a chuck aligned over said support for the receipt of an evacuating tube, a press head arranged intermediate said chuck and support, means to heat a press to plasticity, and means for lowering said chuck and head to bring an evacuating tube into sealing relation with a press and to force the press into sealing relation with associated lead-in wires.

11. In an assembly for sealing together lamp parts, a support for a glass press and for lead-in wires to be sealed into a press, a chuck aligned over said support for the receipt of an evacuating tube, a press head arranged intermediate said chuck and support, means to heat a press to plasticity, means associated with said support for effecting a slight downward movement of lead-in wires relative to the plastic press and means for lowering said chuck and head to bring an evacuating tube into sealing relation with a press and to force the press into sealing relation with associated lead-in wires.

12. In an assembly for sealing lamp parts together, an apertured support for a glass press also having apertures for the receipt of lead-in wires passing through the apertures in said support, means for rotating said support, means for heating a press deposited on said support, and means associated with said support to grip and draw lead-in wires passing through apertures of the support and press downwardly relative to said support and to the major portion of the press.

RAY A. HINKLEY.
EDMUND H. WELLECH.